United States Patent Office 3,246,983
Patented Apr. 19, 1966

3,246,983
ELECTROPHOTOGRAPHIC REPRODUCTION PROCESS
Oskar Sus, Martha Tomanek, Kurt Walter Klupfel, Hans Behmenburg, and Wilhelm Neugebauer, all of Wiesbaden-Biebrich, Germany, assignors, by mesne assignments, to Azoplate Corporation, Murray Hill, N.J.
No Drawing. Filed Apr. 6, 1960, Ser. No. 20,282
Claims priority, application Germany, Apr. 8, 1959, K 37,422
11 Claims. (Cl. 96—1)

Among modern reproduction processes the electrophotographic process, also known as xerography, is becoming of increasing practical importance. This dry process is becoming of particular interest in certain fields, for example, office duplicating, and it consists in the application to a material consisting of support and a photoconductive insulating layer adherent thereto of an electrostatic charge which imparts to the insulating layer the property of light-sensitivity. Material made light sensitive in this way can be used for the production of images by electrophotographic means. It is exposed to light beneath a master, so that the electrostatic charge is leaked away in those parts of the layer struck by light. The invisible latent electrostatic image thereby produced is made visible, (developed) by powdering over with a developer consisting of a mixture of a carrier with a toner. The carrier used may be, e.g., tiny glass balls, iron powder or other inorganic substances and also organic substances. The toner consists of a resin-carbon black mixture or of pigmented synthetic resing of a grain size of 1–100µ, preferably 5–30µ. The image is then made permanent (fixed) by the application to the support of heat.

Materials known for the preparation of the photoconductive insulating layers required for the above-described process include selenium, sulphur, zinc oxide, and also organic substances such as anthracene or anthraquinone. Consideration has also been given to a method of preparation for the photoconductive insulating layers whereby the photoconductive compounds, in association with binders, are dispersed in solvents and the resultant dispersions are applied to supports, primarily metal foils, and dried. However, the photoelectrically sensitizable material thus obtained has not yet satisfied the extensive demands made upon modern duplicating material in respect to range of use, reliability, simplicity in handling and, not least in importance, light-sensitivity and storageability qualities.

It has now been found that unexpectedly successful photoelectrically sensitizable layers with a surprising range of practical applications are produced if as photoconductive substances compounds are used which correspond to the general formula

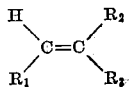

in which $R_1$ is a styryl radical or a monovalent radical of an aromatic carbocyclic ring or heterocyclic ring of aromatic nature, which radicals may be substituted, $R_2$ is hydrogen, acyl or cyano and $R_3$ is a monovalent radical of an aromatic carbocyclic ring or heterocyclic ring of aromatic nature which may be substituted, or a carbalkoxy, acyl, carbamido, or cyano radical.

The preparation of the compounds corresponding to the above general formula, which are to be used in accordance with the invention, is by known procedures. Some of them are produced by the condensation of substituted or non-substituted aromatic aldehydes with a component containing an active methylene group, the two reaction components being dissolved in alcohol with an alkaline condensation agent such as piperidine, methylamine, sodium carbonate, sodium hydroxide or potassium hydroxide. Some of the compounds in accordance with the invention are already described in the literature. Where this is not the case, details on preparation are given below.

Exemplary of the compounds to be used in accordance with the invention are the following:

Formula 1

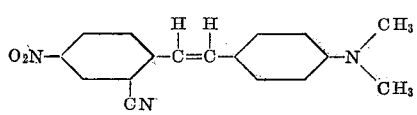

Formula 2

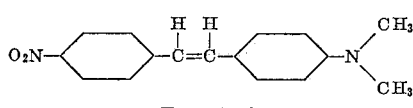

Formula 3

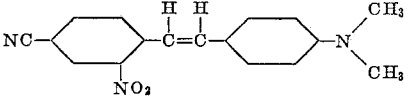

Formula 4

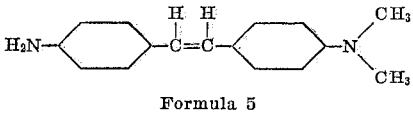

Formula 5

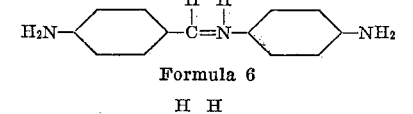

Formula 6

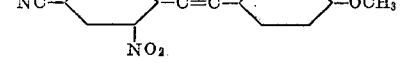

Formula 7

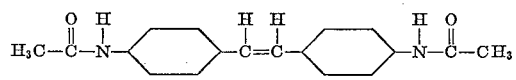

Formula 8

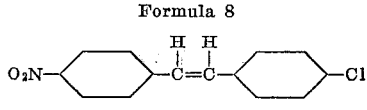

Formula 9

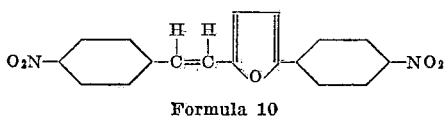

Formula 10

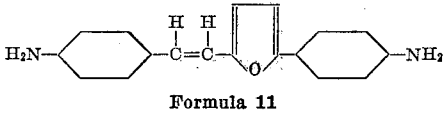

Formula 11

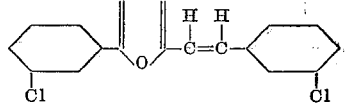

Formula 12

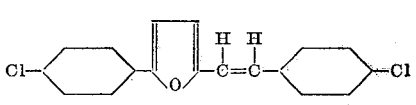

3,246,983

Formula 13
H₅C₂OOC—⟨ ⟩—⟨O⟩—CH=CH—⟨ ⟩—COOC₂H₅

Formula 14
⟨N=⟩—C(NH)=CH—CH=⟨S⟩ (benzimidazole linked via CH=CH to thiophene)

Formula 15
H₂N—⟨benzimidazole⟩—C=CH—CH=⟨ ⟩—N(CH₃)₂

Formula 16
⟨benzimidazole⟩—C=CH—CH=⟨ ⟩—CH₃

Formula 17
H₂N—⟨benzimidazole⟩—C=CH—CH=⟨ ⟩—NH₂

Formula 18
H₂N—⟨benzimidazole⟩—C=CH—CH=⟨ ⟩

Formula 19
⟨benzimidazole⟩—C=CH—CH=⟨ ⟩—Cl

Formula 20
⟨tetrahydroquinoline⟩—CH=CH—⟨ ⟩—N(CH₃)₂

Formula 21
⟨tetrahydroquinoline⟩—CH=CH—⟨tetrahydroquinoline⟩

Formula 22
H₃C—⟨pyranone⟩—C=CH—⟨ ⟩—N(CH₃)₂

Formula 23
H₃C—⟨pyranone⟩—CH=CH—⟨ ⟩—N(C₂H₅)₂

Formula 24
H₃C—⟨pyridone-NH⟩—CH=CH—⟨ ⟩—N(CH₃)₂

Formula 25
⟨ ⟩—C(CN)=CH—⟨ ⟩—NO₂

Formula 26
(H₃C)₂N—⟨ ⟩—C(CN)=CH—⟨ ⟩

Formula 27
(H₃C)₂N—⟨ ⟩—CH=C(CO—⟨ ⟩)(⟨ ⟩)

Formula 28
H₃CO—⟨ ⟩—C(CN)=CH—⟨ ⟩—NO₂

Formula 29
H₃CO—⟨ ⟩—CH=C(CO—⟨ ⟩)(⟨ ⟩)

Formula 30
Cl—⟨ ⟩—C(CN)=CH—⟨ ⟩

Formula 31
O₂N—⟨ ⟩—C(CN)=CH—⟨ ⟩

Formula 32
⟨tetralin⟩—C(CN)=CH—⟨ ⟩

Formula 33
⟨anthracenyl⟩—CH=C(CN)—⟨ ⟩

Formula 34
⟨furyl⟩—CH=C(CN)—⟨ ⟩

Formula 35
⟨ ⟩—CH=C(CN)—CN

Formula 36
(H₂C₅)(H₂C₅)N—⟨ ⟩—CH=C(CN)—CN

5
Formula 37
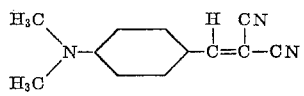
Formula 38
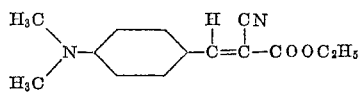
Formula 39
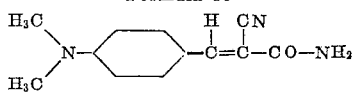
Formula 40
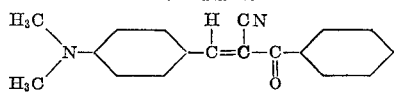
Formula 41
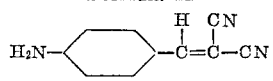
Formula 42
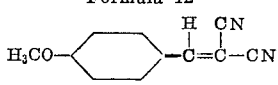
Formula 43
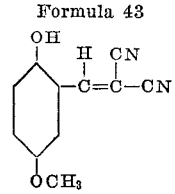
Formula 44
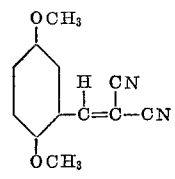
Formula 45
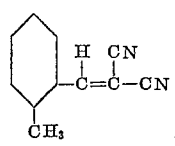
Formula 46
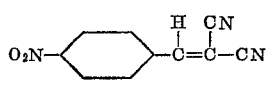
Formula 47
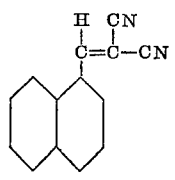
Formula 48
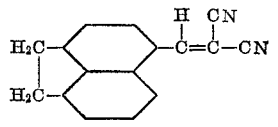
6
Formula 49
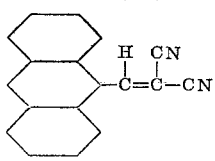
Formula 50
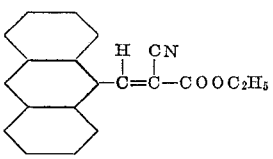
Formula 51
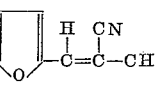
Formula 52
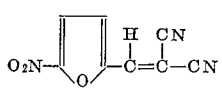
Formula 53
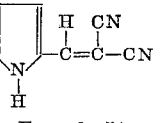
Formula 54
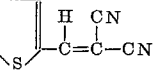
Formula 55
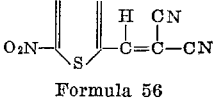
Formula 56
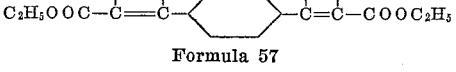
Formula 57
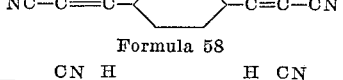
Formula 58
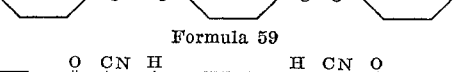
Formula 59
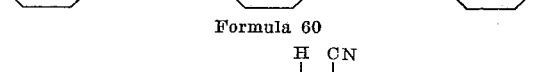
Formula 60
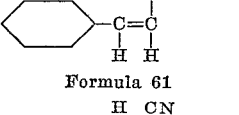
Formula 61
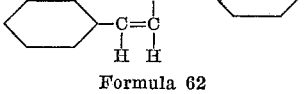
Formula 62
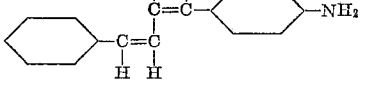

Formula 63

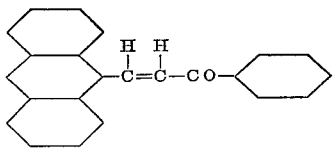

Formula 64

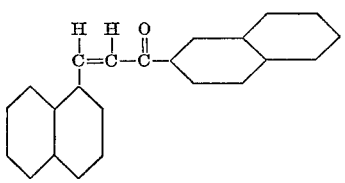

Formula 65

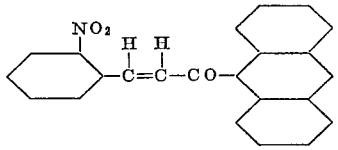

4,4'-diacetamino-stilbene, corresponding to Formula 7 (melting point: 218–220° C.), is prepared by boiling together 21 g. of 4,4'-diamino-stilbene with 250 ml. of acetic anhydride for three hours. The reaction mixture is poured upon ice and the diacetyl compound, corresponding to Formula 7, precipitates out in yellow-brown crystals.

4-chloro-4'-nitro-stilbene, corresponding to Formula 8 (melting point 144° C.), is prepared by melting together 4.23 g. of 4-chloro-benzaldehyde with 5.43 g. of p-nitrophenyl acetic acid, with the addition of a few drops of piperidene. The melting is preformed in an oil bath at 200° C. and the melt is heated to this temperature for three hours. After cooling, the reaction product is purified by recrystallization from glacial acetic acid, with the addition of animal charcoal.

5-(4'-aminophenyl)-2-(4''-aminostyryl) - furan, corresponding to Formula 10 (melting point 148–150° C.), is prepared by catalytic reduction of the compound corresponding to Formula 9. 33.6 g. of 5-(4'-nitrophenyl)-2-(4''-nitrostyryl)-furan are dissolved in 500 ml. of alcohol and 10 g. of Reney nickel are added to the solution as a catalyst. The reduction is carried out in an autoclave with hydrogen, at room temperature. When hydrogen ceases to be taken up, the solution is filtered off from the catalyst and the amino compound is precipitated with water. It can be recrystallized from alcohol. The solutions exhibit a blue fluoroescence.

5-(3'-chlorophenyl)-2-(3''-chlorostyryl) - furan, corresponding to Formula 11 (melting point: 79–80° C.); for the preparation thereof, 12.75 g. of 3-chloroaniline are diazotized with 42 ml. of hydrochloric acid (25%) and 7.3 g. of sodium nitrite in the conventional manner and the filtered diazo solution is added to a solution of 6.9 g. of furyl acrylic acid in 100 ml. of acetone, in which about 45 g. of crystallized sodium acetate are suspended. After the pH value of the mixture has been adjusted to about 6, a solution of 3 g. of copper chloride in 10 ml. of water is added thereto. Because of the copious evolution of gas, the reaction vessel is cooled with ice; after about 45 minutes gas evolution ceases. The reaction mixture is allowed to stand for some time longer and is then subjected to steam distillation. The solid substance remaining after distillation is dried in the air, pulverized and extracted with 8 percent ammonia solution. The residue then remaining is dried and extracted with petroleum ether of a boiling point of 70–90° C. After the petroleum ether has been evaporated off, a light yellow substance remains which is recrystallized from alcohol. In solutions it fluoresces with a strong blue color.

2-(thienylethylenyl)-benzimidazole, corresponding to Formula 14, (melting point 234–235° C.) is prepared by melting together 13.2 g. of 2-methyl-benzimidazole with 11.2 g. of 2-thiophenaldehyde at 200° C. The melt is dissolved with heating in alcohol and when the solution cools the 2-(thienylethylenyl)-benzimidazole precipitates out.

2-(4'-dimethylaminostyryl)-5-(or 6-)aminobenzimidazole, corresponding to Formula 15 (melting point 128° C.), is obtained from the corresponding nitro compound by catalytic reduction with Raney nickel at room temperature. The nitro compound is prepared by melting together 14.9 g. of p-dimethylaminobenzaldehyde with 17.7 g. of 5- (or 6-) nitro-2-methyl-benzimidazole.

2-(3'-methyl-styryl)-benzimidazole, corresponding to Formula 16 (melting point 222–225° C.), is prepared analogously to the compound corresponding to Formula 14, i.e. by melting together 13.2 g. of 2-methyl-benzimidazole with 12 g. of tolyl aldehyde at 200° C.

2-styryl-5- (or 6-)amino-benzimidazole, corresponding to Formula 18 (melting point: 186–189° C.), is prepared by catalytic reduction of the corresponding nitro compound at room temperature. The nitro compound is obtained by melting together 17.7 g. of 5- (or 6-)nitro-2-methyl-benzimidazole with 10.6 g. of benzaldehyde at 200° C.

2-(3'-chlorostyryl)-benzimidazole, corresponding to Formula 19 (melting point 225–227° C.), is prepared analogously to the compound corresponding to Formula 16, by melting together 13.2 g. of 2-methyl-benzimidazole with 14 g. of 3-chlorobenzaldehyde at 200° C.

α,β-diquinolyl-(2)-ethylene, corresponding to Formula 21 (melting point 214° C.), is prepared by melting together 1.43 g. of quinaldine and 1.57 g. of quinoline-2-aldehyde with three drops of piperidine in an oil bath at 160° C. for three hours. The solid residue is purified by repeated recrystallization from benzene with the addition of animal charcoal.

2-(p-dimethylaminostyryl)-6-methyl - pyridone, corresponding to Formula 24 (melting point: 268–270° C.), is prepared from 25 g. of 2-(β-(p-dimethylaminostyryl))-6-methyl-4-pyrone which is heated with 200 g. of formamide for eight hours to 180–190° C. When the reaction is completed, the solution is poured into water and the precipitate is filtered and recrystallized from 96 percent alcohol. In solutions the compound fluoresces with a strong blue color.

5-acenaphthylidene-benzyl cyanide, corresponding to Formula 32 (melting point: 124° C.), is obtained by heating an alcoholic solution of 3.6 g. of 5-acenaphthaldehyde and 3 g. of benzyl cyanide for one hour in the presence of a few drops of sodium ethylate solution. As the solution cools, yellow crystals precipitate out and these are recrystallized from alcohol.

9-anthracenal benzyl cyanide, corresponding to Formula 33 (melting point: 156–157° C.), is prepared analogously to the compound corresponding to Formula 32, i.e. an alcoholic solution of 6.5 g. of anthracene-9-aldehyde and 3.6 g. of benzyl cyanide is heated for one hour in the presence of sodium ethylate.

Furfurylidene benzyl cyanide, corresponding to Formula 34 (melting point: 43° C.), is prepared by heating together an alcoholic solution of 20 g. of furfural and 25 g. of benzyl cyanide in the presence of sodium ethylate. The precipitate that separates out as the solution cools is recrystallized from alcohol.

3-methyl-benzal-malonic acid dinitrile, corresponding to Formula 45 (melting point: 133° C.), is obtained by condensation of 2.4 g. of m-tolyl-aldehyde with 1.32 g. of malonic acid dinitrile in alcoholic solution, in the presence of piperidine at room temperature. The condensation product is purified by recrystallization from alcohol in the presence of animal charcoal.

1-naphthal-malonic acid dinitrile, corresponding to Formula 47 (melting point: 164–165° C.), is obtained by heating together an alcoholic solution of 15.6 g. of 1- naphthaldehyde and 6.6 g. of malonic acid dinitrile in the presence of sodium ethylate. Yellow crystals precipitate out while the reaction mixture is still hot. The compound is recrystallized from alcohol.

Acenaphthylidene malonic acid dinitrile, corresponding to Formula 48 (melting point: 173–174° C.), is obtained by heating together an alcoholic solution of 3.6 g. of 5-acenaphthaldehyde and 1.3 g. of malonic acid dinitrile in the presence of sodium ethylate. Orange-yellow crystals precipitate out while the mixture is still being heated.

9-anthracenal-malonic acid dinitrile, corresponding to Formula 49 (melting point: 206° C.), is obtained by heating an alcoholic solution of 10.3 g. of 9-anthracenealdehyde and 3.3 g. of malonic acid dinitrile in the presence of sodium ethylate. Orange crystals are obtained, which are purified by recrystallization from glacial acetic acid.

9-anthracenal-cyanoacetic acid ethyl ester, corresponding to Formula 50 (melting point: 181° C.), is obtained by heating together 10.3 g. of 9-anthracenealdehyde and 80 ml. of cyanoacetic acid ethyl ester.

5-nitro-furylidene-2-malonic acid-dinitrile, corresponding to Formula 52 (melting point: 175° C.), is obtained when furylidene malonic acid dinitrile is introduced into concentrated nitric acid at 0–5° C. It precipitates out when the reaction mixture is introduced into ice water. The compound is purified by solution in dioxane and reprecipitation with water.

Pyrrol - 2 - ($\beta,\beta'$ - dicyanoethylene), corresponding to Formula 53 (melting point: 129° C.), is obtained if an alcoholic solution of 4 g. of pyrrol-2-aldehyde and 2.6 g. of malonic acid dinitrile is boiled for one hour in the presence of sodium ethylate. After cooling, the reaction product is filtered off and recrystallized from alcohol.

5-nitro-thienylidene - 2 - malonic acid-dinitrile, corresponding to Formula 55 (melting point: 146° C.), is obtained from an alcoholic solution containing 5-nitro-thiophenaldehyde-(2) and malonic acid dinitrile, to which a few drops of piperidine are added. The compound is purified by solution in benzene and reprecipitation by the addition of water.

9-anthracenal-acetophenyl, corresponding to Formula 63 (melting point: 121° C.) is obtained by the condensation of 4.12 g. of anthracene-9-aldehyde with 2.4 g. of acetophenone in alcoholic-alkaline solution. After 48 hours, the precipitate formed is filtered off and twice recrystallized from alcohol.

1-naphthal-$\beta$-acetonaphthenone, corresponding to Formula 64 (melting point 149–150° C.), is obtained by condensation at room temperature of 15.6 g. of 1-naphthaldehyde with 17 g. of 2-acetyl-naphthalene in alcoholic solution in the presence of 10 percent sodium hydroxide solution. In a short time, light yellow crystals precipitate out and are recrystallized from alcohol.

9-(2'-nitrocinnamoyl) - anthracene, corresponding to Formula 65 (melting point: 156–158° C.), is obtained from 11 g. of 1-acetylanthracene and 7.6 g. of 2-nitrobenzaldehyde in alcoholic solution to which 10 percent sodium hydroxide solution is added. The condensation product precipitates out at room temperature and is recrystallized from alcohol.

The compounds to be used in accordance with the invention, of which the amino-substituted compounds, which in their turn may be substituted by alkyl, are used with particular advantage, possess very good photoconductivity and are particularly suitable for the preparation of homogeneous coatings of very good shelf life. The compounds are, for the most part, colorless.

For the preparation of the photoconductive insulating layers, it is advantageous for the compounds to be used in solution in organic solvents, e.g., benzene, acetone, methylene chloride, ethyleneglycol monomethyl ether, and the like Such solutions are applied to supports suitable for photoconductive insulating coatings and possessing adequate conductivity and the solvent is then removed. Mixtures of solvents can also be used. It is possible for the compounds to be used in association with each other and/or other organic photoconductive compounds.

As has further been discovered, it can be an advantage in the production of the photoconductive insulating layers for resins to be used in association with the compounds corresponding to the general formula given above. The following may appropriately be mentioned: natural and synthetic resins, e.g., balsam resins, phenol resins modified with colophony and other resins of which colophony constitutes the major part, coumarone resins and indene resins and the substances covered by the collective term "synthetic lacquer resins," which according to the Kunststofftaschenbuch (Plastics Pocket Book) published by Saechtling-Zebrowski (11th edition, 1955, page 212 onwards) include processed natural substances such as cellulose ethers; polymers such as polyvinyl chlorides, polyvinyl acetate, polyvinyl acetals, polyvinyl ethers, polyacrylic and polymethacrylic esters, as also polystyrene and isobutylene; polycondensates, e.g., polyesters, such as phthalate resins, alkyd resins, maleic acid resins, maleic acid/colophony/mixed esters of higher alcohols, phenol-formaldehyde resins, particularly colophony-modified phenol-formaldehyde condensates, aldehyde resins, urea-formaldehyde resins, melamine-formaldehyde condensates, ketone resins, of which particular mention is to be made of the AW2 resins of the Badische Anilin- und Soda-Fabrik AG., xylene-formaldehyde resins and polyamides; polyadducts, such as polyurethanes.

If the compounds are used in association with resins, the proportion of resin to photoconductive compound can vary very greatly, but the content of the photoconductor should be more than 20%. The use of mixtures of approximately equal parts of resin and photoconductive compound has been found advantageous. If such mixtures of approximately equal parts of resin and photoconductive substance are used, the solutions, on drying, in most cases give homogeneous, transparent layers which physical testing shows to be solid solutions.

The base materials used as supports may be any that satisfy the requirements of xerography, e.g., metal or glass plates, paper or plates or foils made of electrically conductive resins or plastic resins, such as polyvinyl alcohol, polyamides and polyurethanes. Generally, electroconductive supports are suitable for the purposes of the present invention. In the sense of the present invention, the term "electroconductive support" comprises materials having a specific conductivity higher than $10^{-12}$ohm$^{-1}$.cm.$^{-1}$, preferably higher than $$10^{-10}\text{ohm}^{-1}.\text{cm.}^{-1}$$

If paper is to be used as a support for the photoconductive layer, pretreatment of the paper against penetration of the coating soltuion is advisable, e.g., with methyl cellulose in aqueous solution or polyvinyl alcohol in aqueous solution or with a solution in acetone and methylethyl-ketone of a copolymer of acrylic acid methyl ester and acrylonitrile or with solutions of polyamides in aqueous alcohols. Aqueous dispersions of substances suitable for the pretreatment of the paper surface may also be used.

The solutions of the compounds, with or without the resins, are applied to the supports in the usual manner, for example, by spraying, by direct application, by means of rolls, etc., and then dried so as to produce a homogeneous photoconductive layer on the support.

After an electrostatic charge has been applied to the layers, for example, after they have been positively or negatively charged by means of a corona discharge, the layers are light-sensitive and can be used with longwave U.V. light of 3600–4200 A. for electrophotographic image production. Very short exposure under a master to a high pressure mercury lamp will give good images.

The further discovery has been made that the spectral sensitivity of the photoconductive layer to the visible part of the spectrum can be highly improved by the addition of dyestuffs. The amount of "sensitizer" to be added to the photoconductive compound amounts in general up to 3 percent of the photoconductive compound. However, even very small quantities, e.g., less than 0.01 percent, have considerable effect. As "sensitizers," dyestuffs in particular are suitable, for the readier identification of which the number is given under which they are listed in Schultz "Farbstofftabellen" (7th edition, 1st vol., 1931). The following are given as examples of effective sensitizers: triarylmethane dyestuffs such as Brilliant Green (No. 760, p. 314), Victoria Blue B (No. 822, p. 347), Methyl Violet (No. 783, p. 327), Crystal Violet (No. 785, p. 329), Acid Violet 6B (No. 831, p. 351); xanthene dyestuffs, namely rhodamines, such as Rhodamine B (No. 864, p. 365), Rhodamine 6G (No. 866, p. 366), Rhodamine G extra (No. 865, p. 366), Sulphorhodamine B (No. 863, p. 364), and Fast Acid Eosin G (No. 870, p. 368), as also phthaleins such as Eosin S (No. 883, p. 375), Eosin A (No. 881, p. 374, (Erythrosin (No. 886, p. 376), Phloxin (No. 890, p. 378), Bengal Rose (No. 889, p. 378), and Fluorescein (No. 880, p. 373); thiazine dyestuffs such as Methylene Blue (No. 1038, p. 449); acridine dyestuffs such as Acridine Yellow (No. 901, p. 383), Acridine Orange (No. 908, p. 387) and Trypaflavine (No. 906, p. 386); quinoline dyestuffs such as pinacyanol (No. 924, p. 396), and Cryptocyanine (No. 927, p. 397); quinone dyestuffs and ketone dyestuffs such as Alizarin (No. 1141, p. 499), Alizarin Red S (No. 1145, p. 502), and Quinizarine (No. 1148, p. 504); cyanine dyestuffs, e.g., Cyanine (No. 921, p. 394) and chlorophyll.

The production of images by electrophotographic means is effected as follows: When the photoconductive layer has been charged positively or negatively by means of, for example, a corona discharge with a charging apparatus maintained at 6000–7000 volts, the support, e.g. paper or aluminum foil or plastic foil, with the sensitized coating, is exposed to light under a master or by episcopic or diascopic projection and is then dusted over in known manner with a developer consisting of a mixture of a carrier and a toner. The carriers used may be, for example, tiny glass balls, iron powder, or other inorganic substances or even organic substances. The toner consists of a resin-carbon black mixture or a pigmented resin of a grain size of 1 to $100\mu$, preferably $5-30\mu$. The image that now becomes visible can be easily wiped off. It therefore has to be fixed; it can, for example, be briefly heated to about 120° C., or, according to the fusion temperature of the developer used, it can be exposed to infra-red radiation. The temperature required is less if the heat treatment is carried out in the presence of vapors of solvents such as trichloroethylene, carbon tetrachloride, or ethyl alcohol. The fixing of the powder image can also be effected by steam treatment. The finely divided toner particles adhere to the parts of the coating not struck by light during the exposure and a positive image becomes visible if the photoconductive layer was negatively charged and the toner carrying a positive polarity is used. With the same toner, only by changing the polarity of the corona discharge, there can be obtained also reversal images of the master. The images obtained are characterized by good contrast effect.

These electrophotographic images can be converted into a printing plate, if a hydrophilic foil, e.g. paper or plastic foil, is used as the support and the fixed image is wiped over with a solvent for the photoconductive layer, e.g., alcohol or acetic acid, then wetted with water and inked up in known manner with greasy ink. In this way positive printing plates are obtained which can be set up in an offset machine and used for printing. Very long runs are obtained.

If transparent supports are used, the electrophotographic images can also be used as masters for the production of additional copies on any type of light-sensitive sheets. In this respect, the photoconductive compounds are superior to the substances used hitherto, such as selenium or zinc oxide, inasmuch as the latter give only cloudy layers.

If translucent supports are used for the photoconductive layers reflex images can be produced also.

Moreover, the photoconductive layers have a further important advantage in that they can be charged positively as well as negatively. This has the advantage that with the same developer, merely by changing the polarity of the corona discharge, it is possible to obtain direct and reversal images from the same master. The photoconductivity of the photoconductive material according to the present invention is superior to that of known organic photoconductors, such as anthracene, benzidine, and anthraquinone.

No difficulties are encountered if, prior to being fixed, the image produced by powdering over is transferred, in the usual manner by charging, to another support and there fixed by heat. In this case, the electric field applied to the transfer material should have the same polarity as that of the charge originally applied to the electrophotographic material before exposure. The invention will be further illustrated by reference to the following specific examples:

Example 1

A solution of 1 g. of the compound corresponding to Formula 37, and 1 g. of coumarone resin, e.g. the commercial product Coumaronharz 701/70, in 30 ml. of benzene is coated upon paper, the surface of which has been pretreated in known manner against the penetration of organic solvents, and the coating is dried. On this paper direct images are produced by the electrophotographic process in the following manner: the paper is given a negative electrostatic charge by means of a corona discharge and is then exposed under a master to the light of a high-pressure mercury vapour lamp or to a 100 watt incandescent lamp and afterwards dusted over with a developer consisting of a mixture of a carrier and a toner. The carrier used may consist of tiny glass balls, iron powder or other inorganic substances or even organic substances. The toner consists of a resin-carbon black mixture which takes on a positive polarity when the developer is used. The particles of the toner have a grain size of 1 to $100\mu$, preferably $5-30\mu$. The finely divided resin adheres to the parts of the coating not struck by light during the exposure and a positive image becomes visible if the photoconductive layer is negatively charged and the toner carrying a positive polarity is used. With the same toner, only by changing the polarity of the corona discharge, there can be obtained also negatives of the master. The images obtained are heated and thereby made permanent (fixed); they show good contrast effect on yellow ground.

If, instead of paper, a suitable transparent plastic foil or transparent paper is used as a support for the photoconductive coating, the images produced are suitable as duplicating masters for use with any type of light-sensitive sheets.

Example 2

A solution containing 1 g. of the compound corresponding to Formula 3 and 2 g. of ketone resin, e.g., the commercially available Kunstharz AP, in 50 ml. of a mixture of dimethyl formamide and benzene (7:3) is coated upon an aluminum foil. After evaporation of the solvent, the red coating adheres firmly to the aluminum surface. With the coated aluminum foil, electrophotographic images can be prepared in the manner described in Example 1.

If, after the image has been dusted over with the developer described in Example 1 but not fixed, a sheet of paper is placed thereon, the carbon-black-resin powder image can be transferred under the influence of an electric field from the aluminum foil to the paper, a mirror image of the electrophotographic image being thereby produced. In this case, the electric field should have the same polarity as that of the charge originally applied to the foil before exposure. If the carbon black-resin image is transferred to transparent paper or transparent plastic foil, the image obtained can be further copied, e.g., on diazo paper.

*Example 3*

1 g. of the compound corresponding to Formula 56 and 2 g. of modified phenol-maleic acid resin, e.g. the resin commercially available under the registered trademark "Beckacite K 105," are dissolved in a solvent mixture of 25 ml. each of benzene and acetone, and two consecutive 10 ml. applications of this solution are made to a DIN A 4 sheet of transparent paper. After evaporation of the solvent, the nearly colorless coating adheres firmly to the paper surface. In accordance with the details given in Example 1, direct images can be produced on this coated transparent paper. They are characterized by good contrast effect and can be used, for example, as intermediate originals for further copying.

*Example 4*

1 g. of the compound corresponding to Formula 58 and 1 g. of ketone resin, e.g., the commercially available Kunstharz EM, are dissolved in 30 ml. of glycol monomethyl ether and applied to paper by the method described in Example 1. After drying, the coating thus produced is electrostatically charged. An image of a master unsuitable for contact copying, e.g., a page of a book, is projected by means of an optical system upon the electrophotographic paper so that a mirror image is produced, which is then dusted over with a developer, e.g., that described in Example 1.

Paper suitable for the preparation of paper printing foils, of the type commercially available, is placed on the non-fixed mirror image positive thus obtained and the non-fixed powder image is transferred to the transfer paper by means of an electric field. After the transferred image, which with respect to the original master is a correct image, has been fixed upon the transfer paper, e.g., by radiation from an infra-red radiator, the image is inked up with greasy ink and is ready for use as a printing plate, e.g. on an offset machine. A very long run is obtained.

*Example 5*

A solution, containing in 30 g. of glycol monomethylether, 1 g. of the compound corresponding to Formula 23 and 1 g. of a ketone resin, e.g., the commercial product Kunstharz EM, which is a ketone resin produced by polycondensation, is applied to paper the surface of which has been treated against the penetration of organic solvents and dried. On this coated paper, a direct image is produced by the electrophotographic process in the following manner: the paper is given a positive electric charge by means of a corona discharge and is then exposed under a positive master to the light of a high pressure mercury vapor lamp and dusted over with a developer consisting of a mixture of carrier and toner. The carrier used can be, for example, tiny glass balls, iron powder or other inorganic substances or even organic substances. The toner consists of a resin-carbon black mixture or a pigmented resin of a grain size of 1 to 100μ. The finely divided resin adheres to the parts of the coating not struck by light during the exposure and a positive image becomes visible. It is slightly heated and thereby made permanent (fixed). It has good contrast effect.

*Example 6*

1.5 g. of the compound corresponding to Formula 5, 0.5 g. of the compound corresponding to Formula 7, 1 g. of coumarone resin, e.g. the type commercially available known as Cumaronharz 701/70, and 0.01 g. of methylene blue (Schultz' "Farbstofftabellen," 7th edition, 1st vol. No. 1038) are dissolved in 30 g. of benzene and the solution is applied to a paper of the type described in Example 1 and dried. In known manner the paper thus coated is given a negative electric charge and is then discharged by exposure to the light of a high pressure mercury vapor lamp or an incandescent lamp. If a master is interposed, a latent electrostatic image of the master used will be produced. The addition of methylene blue enables the exposure time to be reduced to one fifth of that necessary in the absence of the sensitizer.

*Example 7*

1 g. of the compound corresponding to Formula 12, 1 g. of phenol-modified synthetic resin, e.g. the resin obtained by polycondensation which is marketed under the registered trademark Rhenophen 140, and 0.02 g. of Rhodamine B (Schutz's "Farbstofftabellen," 7th edition, 1st vol., No. 864) are dissolved in benzene. This solution is applied to non-transparent but light-transmitting paper, the surface of which has been pretreated against the penetration of organic solvents; the coated paper is dried. It is given a positive electric charge by means of a corona discharge and placed with the coated side thereof upon a page of a book which is printed on both sides and beneath which a sheet of black paper is placed. The material is then exposed for one second to the light of a 100 watt incandescent lamp, the light passing through the non-transparent but light-transmitting paper. The latent reflex image thereby produced is dusted over with a developer, e.g., the developer described in Example 1. A positive mirror image very rich in contrast is obtained. If a sheet of paper, a plastic foil or a textile fabric is firmly pressed upon the powder image thus obtained, the image is transferred and a correctly reading image is obtained on the paper or foil or textile fabric. In the preparation of the correctly reading image, it is also possible, as is known per se, for an electric field to be applied to the transfer material which is to accept the powder image. If the paper or foil is transparent, intermediate originals for further copying are obtained, e.g., on diazo paper.

*Example 8*

Paper is coated with a solution containing 10 g. of chlorinated polyvinyl chloride, e.g., the product marketed under the registered trademark Rhenoflex, in 100 g. of acetone; the coated solution is dried. After the coating has dried the paper is coated with a solution containing 1 g. of the compound corresponding to Formula 24 and 1 g. of ketone resin, e.g., the commercial product Kunstharz AP, in 30 g. of glycol monomethyl ether and, after again drying, is further treated by the method described in Example 1. When the paper, provided with a positive charge, is exposed to the light of a 100 watt incandescent lamp at a distance of about 15 cm., latent electrostatic images, which after development are very rich in contrast, will be produced after as little as one second.

*Example 9*

1 g. of the compound corresponding to Formula 10, 1 g. of zinc resinate, e.g., the commercial product Zinkresinat 357, and 0.02 g. of Acid Violet 6 BN (Schultz' "Farbstofftabellen," 7th edition, 1st vol., No. 831) are dissolved in 30 g. of glycol monomethyl ether; the solution is applied to paper and dried. After being charged by means of a corona discharge, the paper, now light-sensitive, is exposed under a master to the light of a 100 watt incandesecent lamp at a distance of about 15 cm. for a quarter of a second and then powdered over with a developer consisting of the mixture of carrier and toner already described in detail in Example 1. A positive or a negative image is produced, depending on the polarity of the charge and the toner used. The powder image is then fixed by heating.

Example 10

The procedure described in Example 1 is repeated but for coating the paper, a solution of 1 g. of the compound corresponding to Formula 17 and 1.5 g. of a polymerized natural resin, e.g., the commercially available resin known as Hercules Poly Pale, in 30 g. of glycol monomethyl ether is used. With the coated paper positive images are obtained by the electrophotographic process.

Instead of the above resin, a resin consisting mainly of dimerized abietic acid, e.g., the commercially available resin Hercules Dymerex, or a hydrogenated natural rein, e.g., Hercules Staybelite, can be used.

Example 11

The procedure described in Example 1 is repeated, but for the coating of the paper a solution of 0.5 g. of the compound corresponding to Formula 63 and 0.5 g. of the compound corresponding to Formula 13 in 30 g. of glycol monomethyl ether is used. The images obtained are very rich in contrast and positives are obtained from positive masters. The electrostatic image can also be produced by episcopic projection from double-sided printed pages. Half tones and solids are reproduced with good contrast.

Example 12

0.5 g. of the compound corresponding to Formula 22, together with 1.5 g. of 2,5-bis-(4'-diethylamino-phenyl-(1'))-1,3,4-oxadiazole and 1 g. of modified phenol-maleic acid resin, e.g., the resin marketed under the registered trademark Beckacite K 125 are dissolved in 30 g. of benzene. The benzene solution is then applied to a superficially roughened aluminum foil; after evaporation of the solvent, the coating left behind adheres firmly to the surface of the foil. For the preparation of an image, the procedure described in Example 1 is used and from a positive master a positive image is obtained which is fixed in a manner analogous to that described in Example 1. This image is converted into a positive printing plate if the aluminum foil is wiped over on the image side with alcohol (96 percent), rinsed down with water and inked with greasy ink and 1 percent phosphoric acid.

It will be obvious to those skilled in the art that many modifications may be made within the scope of the present invention without departing from the spirit thereof, and the invention includes all such modifications.

What is claimed is:

1. A photographic reproduction process which comprises electrostatically charging a supported photoconductive insulating layer, exposing the charged material to light under a master and developing the resulting image with an electroscopic material, the photoconductive layer comprising a compound having the formula

in which $R_1$ is selected from the group consisting of styryl and aryl groups, and $R_2$ is selected from the group consisting of aryl, carbalkoxy, acyl, carbamido, and cyano groups.

2. A process according to claim 1 in which the photoconductive layer contains a spectrally sensitizing dyestuff.

3. A process according to claim 1 in which the photoconductive layer contains a resin.

4. A photographic reproduction process which comprises electrostatically charging a supported photoconductive insulating layer, exposing the charged material to light under a master and developing the resulting image with an electroscopic material, the photoconductive layer comprising a compound having the formula

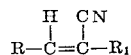

in which R is an aryl group and $R_1$ is an amido group.

5. A photographic reproduction process which comprises electrostatically charging a supported photoconductive insulating layer, exposing the charged material to light under a master and developing the resulting image with an electroscopic material, the photoconductive layer comprising a compound having the formula

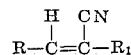

in which R is in aryl group and $R_1$ is a carbalkoxy group.

6. A photographic reproduction process which comprises electrostatically charging a supported photoconductive insulating layer, exposing the charged material to light under a master and developing the resulting image with an electroscopic material, the photoconductive layer comprising a compound having the formula

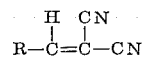

in which R is an aryl group.

7. A photographic reproduction process which comprises electrostatically charging a supported photoconductive insulating layer, exposing the charged material to light under a master and developing the resulting image with an electroscopic material, the photoconductive layer comprising a compound having the formula

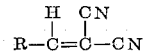

in which R is a styryl group.

8. A photographic reproduction process which comprises electrostatically charging a supported photoconductive insulating layer, exposing the charged material to light under a master and developing the resulting image with an electroscopic material, the photoconductive layer comprising a compound having the formula

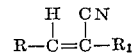

in which R and $R_1$ are aryl groups.

9. A photographic reproduction process which comprises electrostatically charging a supported photoconductive insulating layer, exposing the charged material to light under a master and developing the resulting image with an electroscopic material, the photoconductive layer comprising a compound having the formula

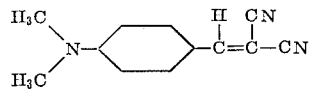

10. A photographic reproduction process which comprises electrostatically charging a supported photoconductive insulating layer, exposing the charged material to light under a master and developing the resulting image with an electroscopic material, the photoconductive layer comprising a compound having the formula

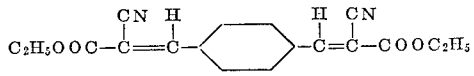

11. A photographic reproduction process which comprises electrostatically charging a supported photoconductive insulating layer, exposing the charged material to light under a master and developing the resulting image with an electroscopic material, the photoconductive layer comprising a compound having the formula

References Cited by the Examiner
UNITED STATES PATENTS

| | | | |
|---|---|---|---|
| 1,965,710 | 7/1934 | Murray | 96—115 |
| 2,297,691 | 10/1942 | Carlson | 96—1 |
| 2,700,046 | 1/1955 | Libby | 252—300 |
| 2,760,863 | 8/1956 | Plambeck | 96—115 X |
| 2,766,239 | 10/1956 | Fleck | 252—301.2 |
| 2,820,811 | 1/1958 | Hoch | 117—33.5 |
| 2,850,520 | 9/1958 | Merian et al. | |
| 2,954,291 | 9/1960 | Clark | 96—1 |
| 3,000,735 | 9/1961 | Gunning et al. | 96—1 |
| 3,047,390 | 7/1962 | Koerber et al. | 96—82 |
| 3,072,479 | 1/1963 | Bethe. | |

FOREIGN PATENTS

| | | |
|---|---|---|
| 201,416 | 4/1956 | Australia. |
| 562,336 | 5/1958 | Belgium. |
| 563,045 | 6/1958 | Belgium. |
| 1,177,936 | 12/1958 | France. |
| 1,188,600 | 3/1959 | France. |
| 1,010,047 | 6/1957 | Germany. |

OTHER REFERENCES

Das Papier, April (1954), pages 109–120.

Grant, Hackhs Chemical Dictionary, 3rd Ed., McGraw-Hill, 1944, page 78 relied on.

Hannay, Semiconductors, Rheinhold (1959), pages 634–675.

Kallmann et al., Physical Review, vol. 97, No. 6, March 15, 1955, pp. 1596–1610 (p. 1599 relied on).

Pauli, Annalen der Physik, 40 (1913), pages 677–700.

Photo Korrespondez, 94 (1958), pages 3–11 and 19–26.

Z. Elektrochem., 57, No. 9 (1953), pages 785–795.

Venkataraman, Synthetic Dyes, Academic Press (1952), pages 1206 and 1207.

NORMAN G. TORCHIN, *Primary Examiner.*

PHILIP E. MANGAN, HAROLD N. BURSTEIN,
*Examiners.*